United States Patent
Lawson et al.

(10) Patent No.: US 8,134,347 B2
(45) Date of Patent: Mar. 13, 2012

(54) APPARATUS AND METHOD FOR RECYCLING THE ENERGY FROM LOAD CAPACITANCE

(75) Inventors: Thomas E. Lawson, Malvern, PA (US); William H. Morong, Norristown, PA (US)

(73) Assignee: CogniPower, LLC, Malvern, PA (US)

( * ) Notice: Subject to any disclaimer, the term of this patent is extended or adjusted under 35 U.S.C. 154(b) by 433 days.

(21) Appl. No.: 12/358,465

(22) Filed: Jan. 23, 2009

(65) Prior Publication Data
US 2009/0189581 A1   Jul. 30, 2009

Related U.S. Application Data

(60) Provisional application No. 61/023,305, filed on Jan. 24, 2008.

(51) Int. Cl.
*G05F 1/10* (2006.01)
(52) U.S. Cl. .................................................... 323/222
(58) Field of Classification Search .............. 323/205, 323/206, 222, 225, 268, 271, 282
See application file for complete search history.

(56) References Cited

U.S. PATENT DOCUMENTS

| | | | |
|---|---|---|---|
| 6,344,985 B1 | 2/2002 | Akerson | |
| 6,370,046 B1 | 4/2002 | Nebrigic et al. | |
| 6,720,675 B2 * | 4/2004 | Azuma et al. | 307/85 |
| 7,948,221 B2 * | 5/2011 | Watanabe et al. | 323/271 |

OTHER PUBLICATIONS

International Searching Authority, International Search Report, Mar. 4, 2009.

* cited by examiner

*Primary Examiner* — Matthew Nguyen

(57) ABSTRACT

The present invention provides a voltage regulator/power converter capable of bidirectional power propagation, fitted with controls capable of raising and lowering voltages with unprecedented speed and accuracy. The bidirectional capability allows energy stored in capacitors to be returned to system power sources. In one embodiment of the invention power is supplied from a power source (on a first port of the power converter) to the load (on a second port of the power converter) through the converter and then, when load voltage is reduced or turned off, energy in the load capacitance is returned from to the power source. In an alternative embodiment energy from load capacitance is stored or used by a device on a third port of the power converter.

12 Claims, 10 Drawing Sheets

APPARATUS AND METHOD FOR RECYCLING THE ENERGY FROM LOAD CAPACITANCE

CROSS-REFERENCE TO RELATED APPLICATIONS

The present application claims the benefit of U.S. Provisional Application Nos. 61/023,305 filed on Jan. 24, 2008, which is incorporated herein by reference.

STATEMENT REGARDING FEDERALLY SPONSORED RESEARCH OR DEVELOPMENT

The present invention was not developed with the use of any Federal Funds, but was developed independently by the inventors.

BACKGROUND OF THE INVENTION

The present invention improves the power efficiency of systems wherein power is conserved by temporarily reducing the voltage supplied to temporarily unused system components. In addition to reducing voltage, the present invention drains charge from filter and bypasses capacitors, or other load-related capacitance, and returns a substantial fraction thereof to system power sources. Thus, when temporary voltage reductions and subsequent restorations become frequent, the loss of energy associated with repeated charging and discharging of capacitors is substantially reduced.

Many computer systems conserve power by temporarily reducing voltage to temporarily unneeded portions of their circuitry. Usually, computer circuitry is replete with capacitors needed to filter line and load transients. Each time such capacitors are charged, energy is imparted to them. Since most voltage regulators can but unidirectionally pass power, each time a voltage reduction occurs capacitive energy is dissipated by the circuitry without useful work being done. In this case, if the cycling up and down of voltage becomes sufficiently frequent, power saved by voltage reduction is largely consumed by charging and discharging capacitors.

This problem of wasted energy from load capacitance is particularly acute with computer servers and server farms. These devices and networks (which may have hundreds at individual computers) have a lot of energy stored in capacitance. They often shut down for periods of time and this stored energy is dissipated (i.e. wasted).

Likewise similar problems exist in portable electronic devices such as cell phones and lap top computers where it is important to conserve all energy. Power stored in the load capacitors of device is typically not returned to the battery.

There exist numerous prior art inventions for intentionally returning to the source, or otherwise usefully employing, the energy that occurs in snubber capacitors. There also exist other bidirectional forms of power converters such as described in U.S. Pat. No. 7,348,767 to Hack et al. The novelty of the current invention lies in the use for of a bidirectional converter for the recovery of capacitive energy stored in the filter and load capacitance. In Hack, bidirectional power flow to and from a reactor is taught, however that reactor in Hack is an inductor internal to the power converter itself, necessary for its power-converting function, and no recovery of energy from a substantially reactive load is taught.

SUMMARY OF THE INVENTION

The present invention provides a voltage regulator/power converter capable of bidirectional power propagation, fitted with controls capable of raising and lowering voltages with unprecedented speed and accuracy. The bidirectional capability allows energy stored in capacitors to be returned to system power sources. Agile response to controls facilitates quick and accurate restoration of voltage when formerly unneeded system components are again needed. Conservation of energy and agile response make practical on-off cycles formerly too short to be considered. In one embodiment of the invention power is supplied from a power source (on a first port of the power converter) to the load (on a second port of the power converter) through the converter and then, when load voltage is reduced or turned off, energy in the load capacitance is returned to the power source. In an alternative embodiment energy from load capacitance can be stored or used by a device on a third port of the power converter. Load capacitance may include load filter capacitors, load line capacitance as well as any capacitive component of the actual load itself.

DETAILED DESCRIPTION OF THE INVENTION

Figure 1:
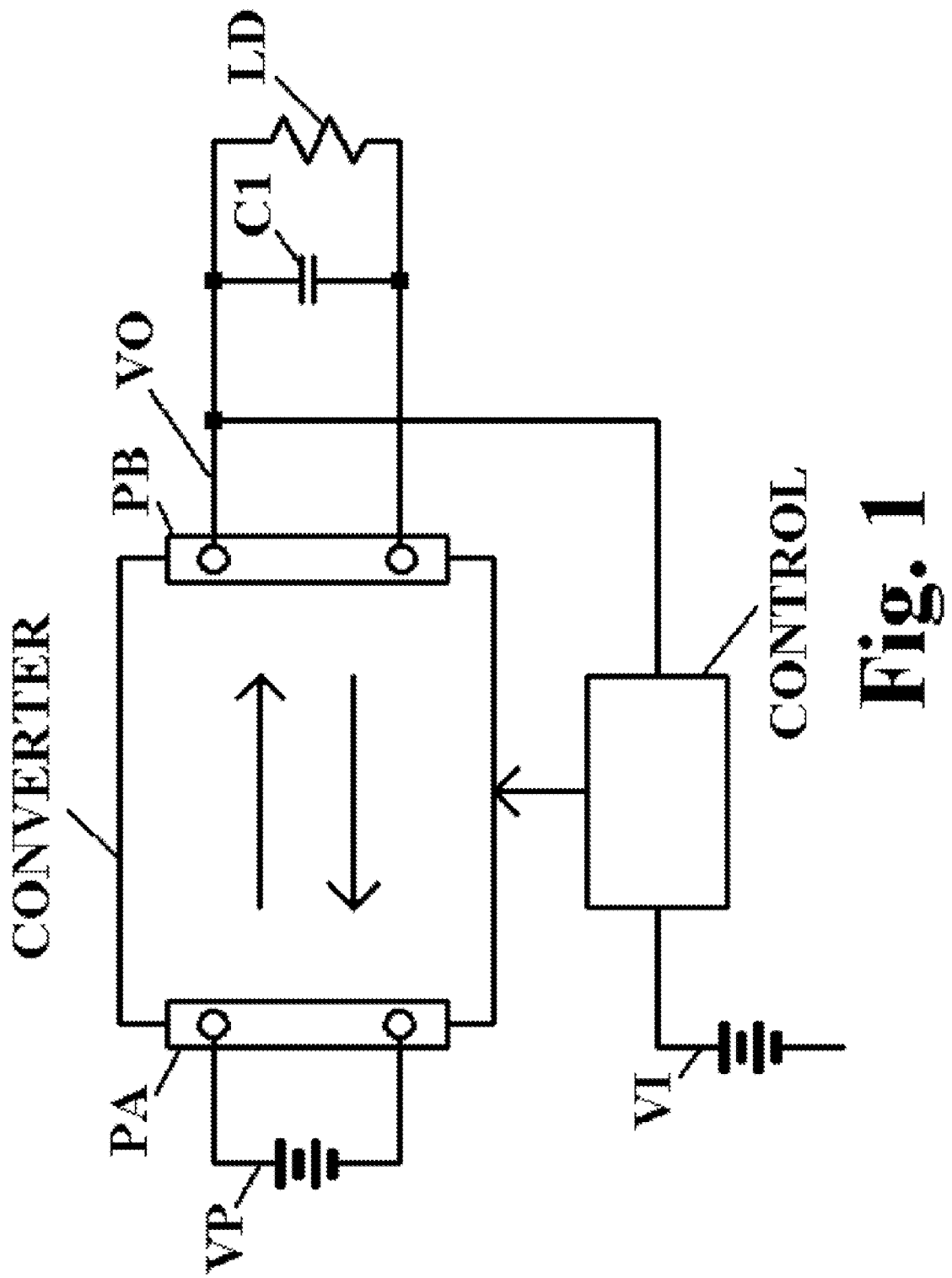
FIG. 1 shows a bidirectional converter according to this invention.

FIG. 1 shows a bidirectional converter, such as a DC-to-DC converter, transferring power bidirectionally between a power source port PA and a load port PB.

A load, represented by resistor LD, and filtered by a capacitor C1, may be connected to PB. The load may be resistive, capacitive, inductive or any combination thereof. C1 represents the aggregate filter and decoupling capacitance of a system load, the resistive energy sink of which is represented by LD. Even if the load is primarily inductive or resistive, in many cases C1 is substantial. As used herein the term "substantially capacitive" means that the energy stored in the capacitive component of the load is equal to at least 5% of the steady state energy requirement of the load. C1 may also represent the capacitance of such an energy-storing capacitive load as a piezo-electric motor. The voltage VO, at PB, is fed back to control circuitry CONTROL which controls VO to be responsive to a desired analog or digital quantity, here represented by a voltage VI. The converter of this invention is abundantly embodied in U.S. patent application Ser. Nos. 11/593,702 filed Nov. 6, 2006 and 11/682,169 filed Mar. 5, 2007, which are hereby incorporated by reference in their entirety, and also may be embodied by other apparatus. This converter, governed by CONTROL, is able quickly to change from transferring energy from PA to PB to transferring energy from PB to PA (or another port if available). It is moreover able to cause the voltage at VO quickly to be regulated to a desired voltage with minimal undershoot or overshoot. The crux of this invention is its ability, under control and when voltage is not required at VO, to transfer energy stored in C1 from PB to PA, returning such energy to source VP before it can be substantially dissipated by LD.

Figure 2:
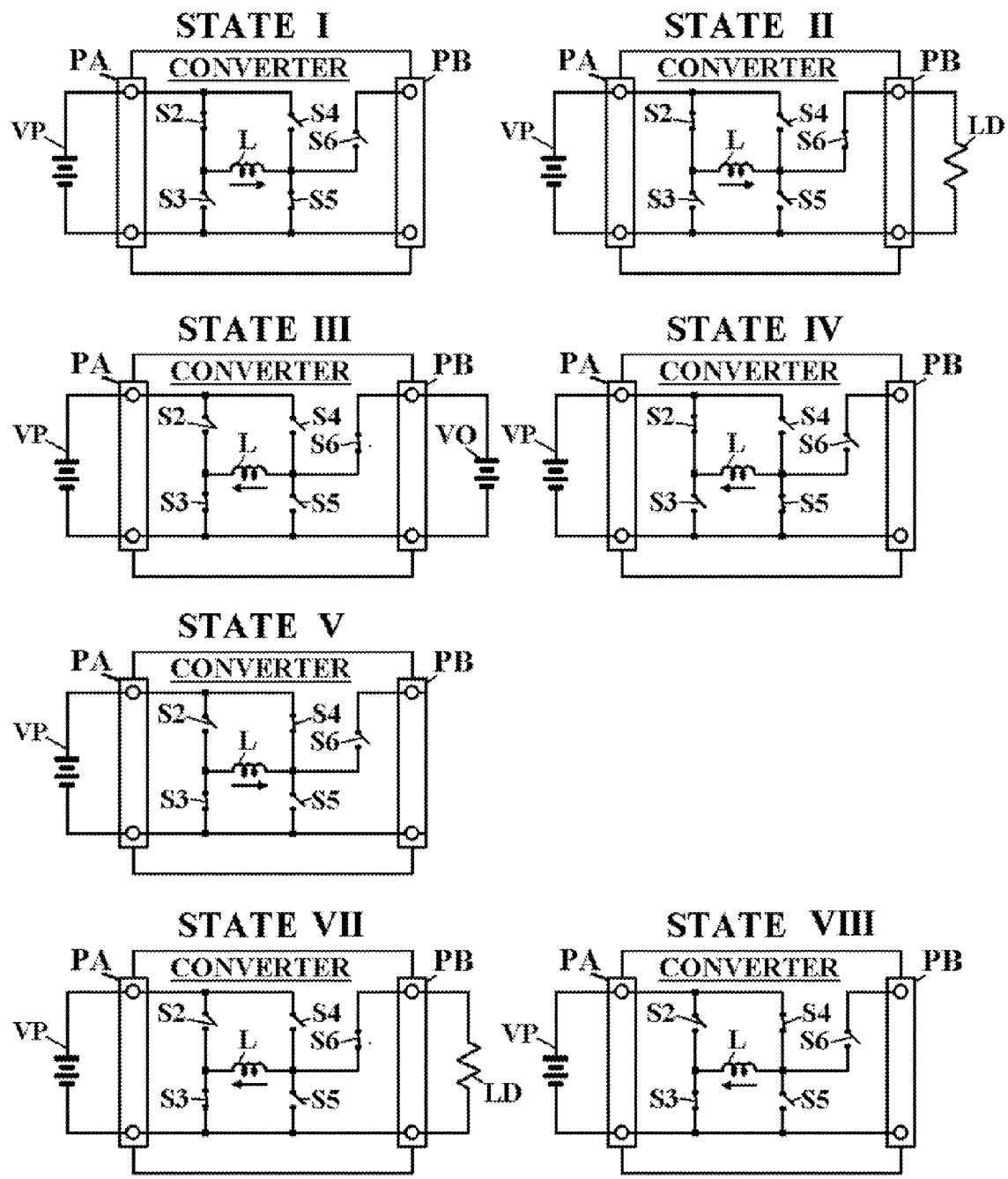
FIG. 2 shows certain useful states of the invention.

FIG. 2 shows useful states for additive flyback converters. In State I, the classic forward energize mode of additive flyback converters, L is shown being energized through S2 and S5.

State II shows the classic flyback, or forward transfer, mode of additive flyback converters.

State III shows the reverse energizing of L from PB through switches S6 and S3. Such energizing might be used to remove excess energy from PB. Note that inductive current flow is reversed from States I, II, and V.

State IV shows a reverse transfer of energy from L to PA. Such a transfer might be used to return to PA undesired energy from PB after State III or State VII. Note that inductive current flow is reversed from States I, II, and V.

State V shows the return of energy from the inductor, L through switches S3 and S4. This mode might be used to return to PA excess forward energy in L.

State VII shows the forward transfer of reverse energy to PB through switches S3 and S6.

State VIII shows the forward negative energize state for loading L with negative energy through switches S4 and S3.

The change of connections at PB in various States is not to say that the load and power source have been moved, but only to indicate that energy is now flowing in or out of the CONVERTER through PB. Likewise though a battery symbol is shown connected to PA, it may be any electrical energy source that may also accumulate energy. One might think of VP as a rechargeable battery that sometimes sources energy to PA, and sometimes sinks energy therefrom. VP may also be a an AC or DC power supply.

Although not shown in FIG. 2, a converter may have a third or more ports. In addition to, or instead of, directing capacitively stored energy back to the power source, the converter may direct the energy to such additional port(s). The additional port(s) may be attached to other loads that can use the energy, or to energy storage devices such as batteries or capacitors.

Examples 1 and 2 below describe converters suitable to implement this invention.

EXAMPLE 1

Flyback Amplifier with Bidirectional Agility

Figure 3:
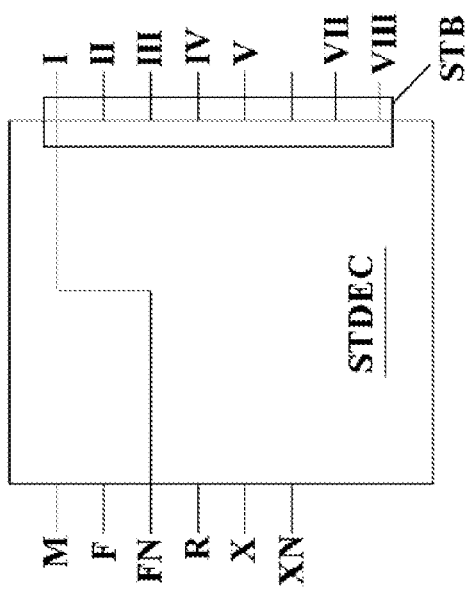
FIG. 3 shows a state decoder used to produce the states of FIG. 2.

FIG. 3 depicts a state decoder STDEC for generating the States I through VIII of FIG. 2 responsive to the outputs of flip-flops to be shown below in FIG. 24 in accordance with the following logical expressions:
State I=M&F
State II=M&/F&/X
State III=/M&R&/FN
State IV=/M&/R&/FN|/M&/R&FN&/XN
State V=M&/F&X
State VII=/M&/R&FN&XN
State VIII=/M&R&FN where the signals cited correspond to those illustrated in FIGS. 3 and 5, and to the like-named States of FIG. 2, and
"&" represents the logical AND function,
"|" represents the logical OR function,
the prefix "/" performs the logical NOT upon its suffix.

For convenience of description the outputs of STDEC are shown as a state bus STB of digital signals.

Figure 4:
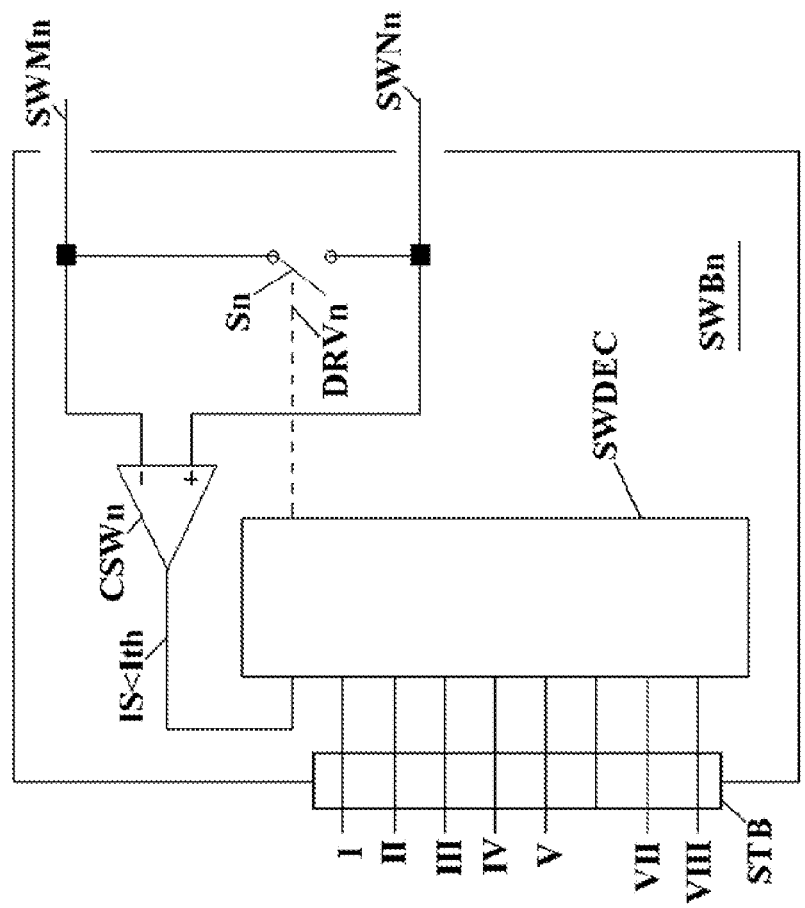
FIG. 4 shows a block diagram of the switch blocks embodying the switches of FIG. 2.
Figure 5:
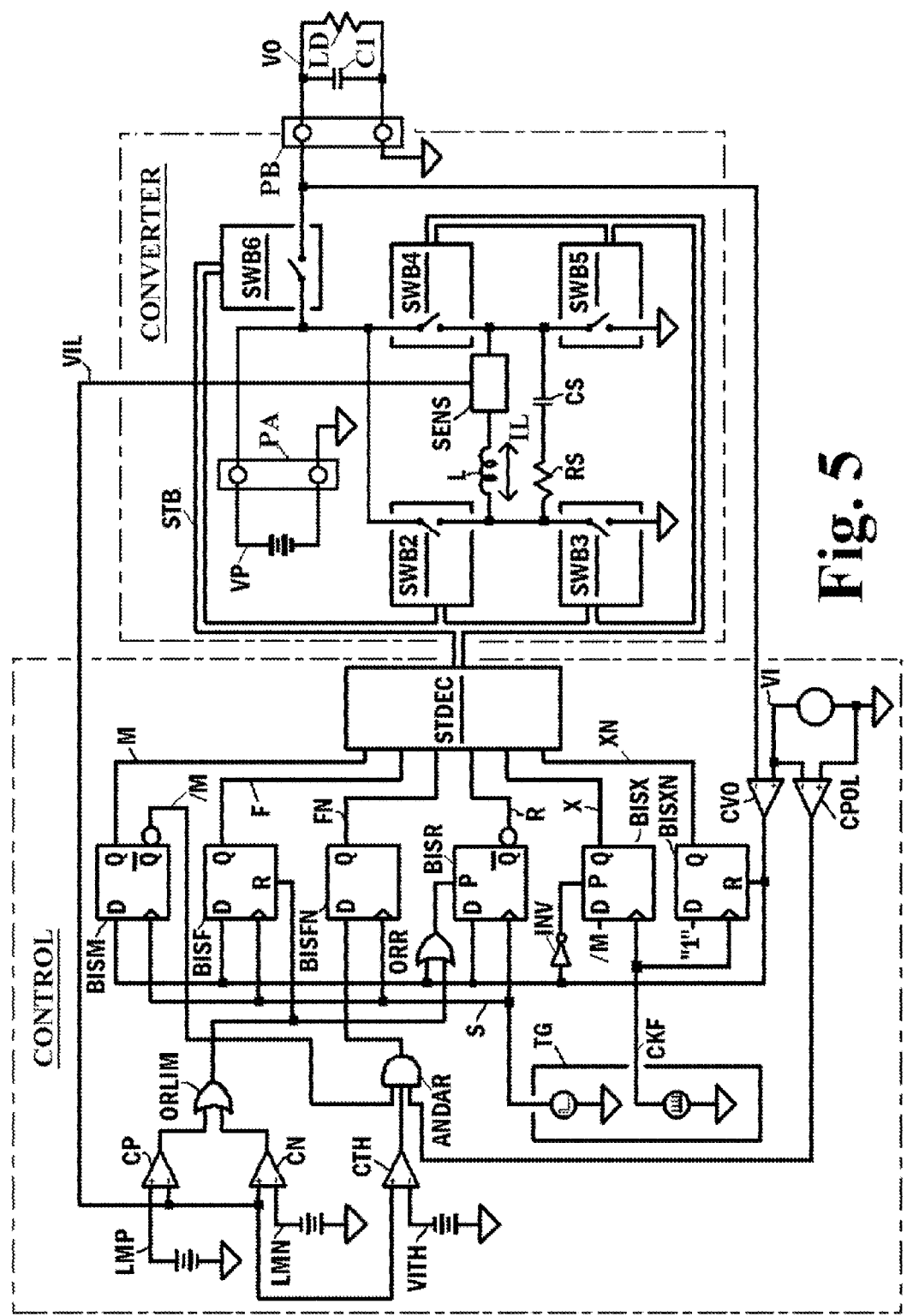
FIG. 5 shows a five-switch bidirectional flyback amplifier with inductive energy storage embodying the features of FIGS. 1, 2, 3, and 4.

FIG. 4 shows switch-block SWBn, which is the embodiment of a single switch of FIG. 2. It is to be understood that the n of SWBn is to be a digit, here 2 through 6, representing an instance of SWBn corresponding to S2 through S6 of FIG. 2. Terminals SWMn and SWNn correspond to the terminals of a single switch of FIG. 2. In this example, shown more fully in FIG. 5 below, five switch-blocks SWB2 through SWB6 are, through STB, served by a single state decoder STDEC. SWDEC, generates a signal DRV to drive Sn to open or close a circuit between terminals SWMn and SWNn according to the requirements of FIG. 2 pertaining to the individual switch's "n" assignment and responsive to the state presently being asserted on STB, and to a signal IS<Ith which is generated by a comparator CSW responsive to voltage across switch S. Thus SWBn remains ON when so assigned until switch current falls below a preset threshold. This is the "until Ith" function also seen in well-known synchronous rectifiers. Decoder SWDEC responds in its instances to STB and IS<Ith in accordance with the following logical expressions:
SWB2=(I&IS<Ith)|II|IV
SWB3=((III|VII)&IS<Ith)|V
SWB4=V&IS<Ith
SWB5=I|(IV&IS<Ith)
SWB6=(II&IS<Ith)|III|VI FIG. 5 shows a bidirectional flyback amplifier with bipolar output capable of proper control even in the well-known continuous-conduction-mode, CCM. The output voltage, VO will follow a reference input voltage, VI, regardless of the polarity of VI or the polarity of the load, LD. If excess energy is present at the output, the bidirectional capability according to this invention allows that energy to be recovered from PB and returned to PA. A typical power supply application would not be required to regulate to both positive and negative voltages, but the flexibility to do so increases utility.

Referring to FIG. 5, five instances of SWBn, labeled SWB2 through SWB6, perform switch decoding and switching correctly to function as S2 through S6 respectively of FIG. 2. C1 represents the load and filter capacitance. VP is the power input voltage, LD represents the load, shown here as resistive, though the operation remains the same with a current load. RS and CS comprise an optional snubber circuit for the switched inductor, L.

A timing generator TG provides a set-pulse S to commence each chopping cycle, causing BISM, BISF, and BISR to latch data from comparator CVO, which is responsive to the polarity of any difference between VO and VI. BISM holds that data until cycle-end. SENS, an inductive energy sensor, generates a signal, VIL, responsive to current, IL, of L, or to the field of L, or to the E-T product applied to L.

Thus, for moving positive energy from VP to VO, BSIF is set so that energize State I begins, followed by forward transfer, State II, that is initiated when an asynchronous event resets BSIF responsive to the increasing absolute value of current in L, represented by VIL. TG of FIG. 5 also comprises a fast clock, CKF, that generates a plurality of transitions within a single period of S. FIG. 5 further comprises a flip-flop BISX which follows /M at the first clocking transition of CKF following S, thus resetting BISX early in a positive energy moving cycle. In FIG. 5, if the regulation voltage is reached, comparator CVO, through inverter INV, resets flip-flop BISX to invoke State V of FIG. 2. Then State V supersedes State II, returning excess inductive energy to VP rather than creating excess voltage at VO.

FIG. 5 further comprises added switch S4, comprised by a switch-block, SWB4, to embody an additional transfer mode corresponding to State V which returns un-transferred energy directly back to the power input port. In FIG. 5, instead of precisely metering the energizing of L during the energize state, L is loaded with a substantial excess of energy controlled by inductive current comparators CP and CN responsive to the difference between VIL and their respective limit signals LMP and LMN, as logically ORed by ORLIM Thus the transfer portion of the cycle is divided into sub-cycles, but with CKF running at a higher frequency than S there can be numerous sub-cycles per period of S.

For the positive polarity, States II and V alternate, responsive to the comparator CVO, for the remainder of the transfer time until the end of the chopping cycle. The inductor current continues to flow in the same direction during State V, but is now directed back to the input port, as shown in FIG. 2. For the negative polarity, States VII and IV likewise alternate.

Figure 6:
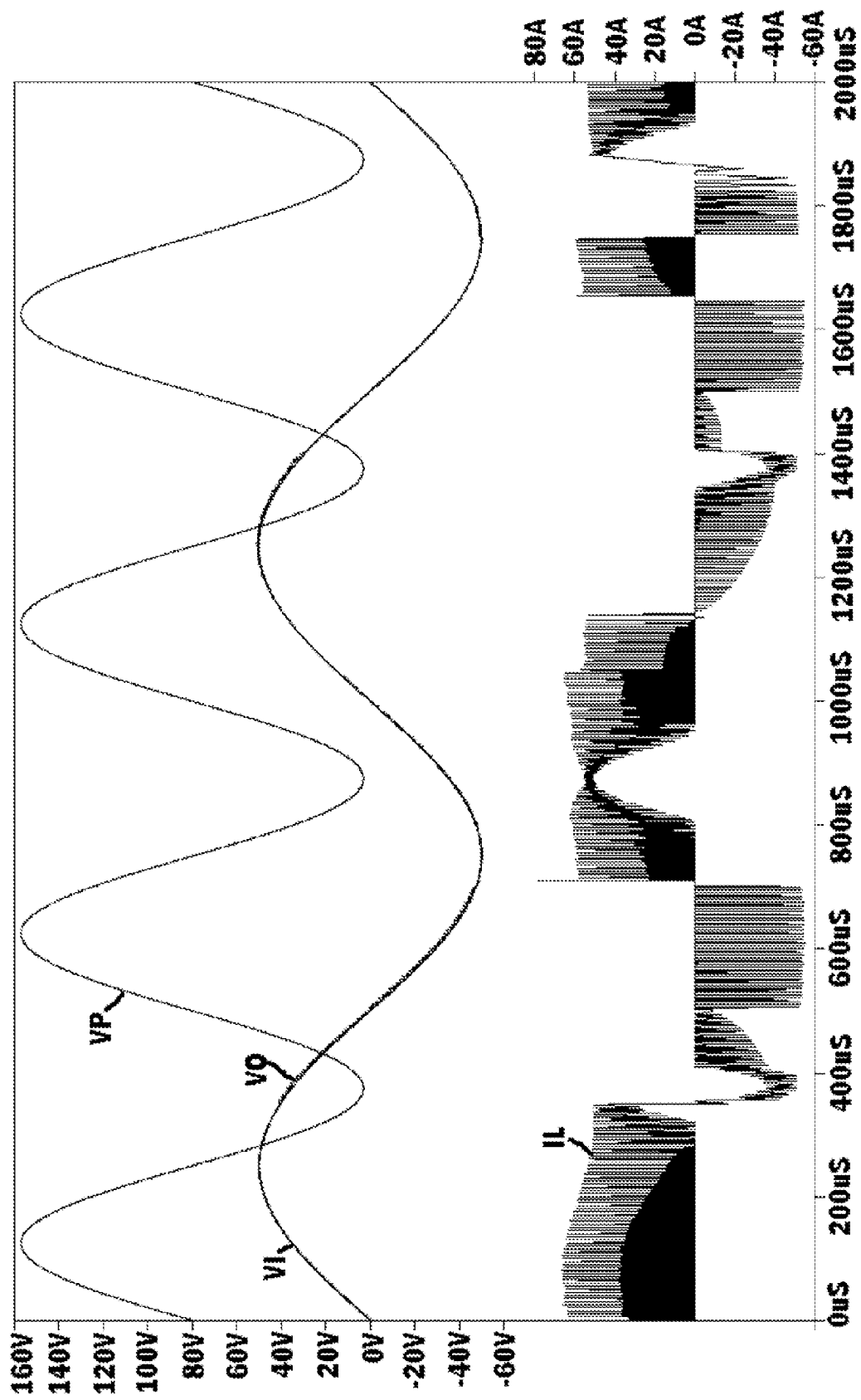
FIG. 6 shows the voltage and current waveforms for the converter of FIG. 5.

Such division of each cycle into three or more active portions (plus a possible additional period of depleted inductor current) for the purpose of improved regulation is unknown in the prior art. FIG. 6 shows the improvement in ripple reduction achieved by adding an 800 kHz clock for CKF. It is evident from FIG. 6 that a multi-phase converter could reduce ripple by maintaining one phase in transfer alternation at all times. The possible improvement in ripple reduction is more than a factor of four.

If CVO is false, M will be false and the cycle being commenced will comprise, in succession, the reverse States III and IV to effect a reverse flyback energy transfer from VO to VP. State III first occurs to energize L from VO. State III may be terminated and State IV be initiated responsive the comparator CVO, which indicates that L has removed sufficient energy from VO, whereupon CVO asynchronously sets BISR through gate ORR, initiating State IV, which persists until the chopping cycle ends. Excessive current in L, as represented by ORLIM being true, will also initiate State IV.

In order to control negative voltages with either polarity of load, a flip-flop, BISFN, is set when the alternation of States III and IV are not sufficient to drive the output far enough negative. Those circumstances are decoded by AND-gate ANDAR, responsive to VO, to /M, CPOL and, comparator CTH, which tests for inductive current of more than VITH, a threshold near zero. Whenever ANDAR determines that the inductor could not gain significant negative charge during State III of a reverse transfer, it will set BISFN. BISFN, once set, causes State VIII to be used as the negative energize state, followed by the State VII to transfer negative energy from the input to the output.

If sufficiency is obtained, bistable BISXN is cleared by the output of comparator CVO. That causes State IV to be invoked to return excess negative energy to the input. The bistable BISXN is clocked by CKF to prevent rapid alternation of States VII and IV. This negative forward transfer sequence matches the normal forward transfer sequence in all regards except the polarity of the inductor current.

This example uses no prediction to determine the appropriate duration of the forward or reverse energize modes. For regulation, it relies entirely on returning excess energy to VP, and in so doing incurs a surprisingly small efficiency penalty. Small additional complexity would allow predictive or adaptive forward energize modes. That would permit an adaptive tradeoff between maximal efficiency and best transient response by adjusting the percentage of inductively stored energy. No A/D converters save single-bit comparator functions are needed for a digital implementation of this technique and no computations more complex than magnitude comparisons, analog or digital, are required.

A comparator that provides the polarity of the error voltage CVO and an overcurrent detector for the switched inductor, CP, CN, and ORLIM, are the only required inputs if the switches have the "until Ith" function built-in, like the International Rectifier IRF 1167. The various switch combinations can be programmed into to a solid state memory and indexed by address lines related to time, polarity and overcurrent as in the well known "state machine", can be programmed into a microcontroller, or other programmable logic device, or can be reproduced using discrete components.

FIG. 6 shows the behavior with a 1 kHz sine wave input signal, VI, with a peak-to-peak amplitude of 100 volts, centered on zero volts. The load current switches from plus 2 A to minus 2 A at 350 uS, back to plus 2 amps at 700 uS, and then to minus 2 A at 1050 uS. The power input voltage, VP, is a 2 kHz sine wave varying from 3 to 157 volts. The output voltage VO and input voltage VI are superimposed and are hard to distinguish here. The inductor current, IL, is seen to be both continuous and discontinuous in both the positive and negative polarities. Note the very minor output disruption at the load transitions due to continuous mode operation. Load transients that do not cross the DCM/CCM boundary are nearly invisible. The ability of an additive flyback converter to handle output voltages much above, much below, or equal to the power input voltage is novel.

Figure 7:
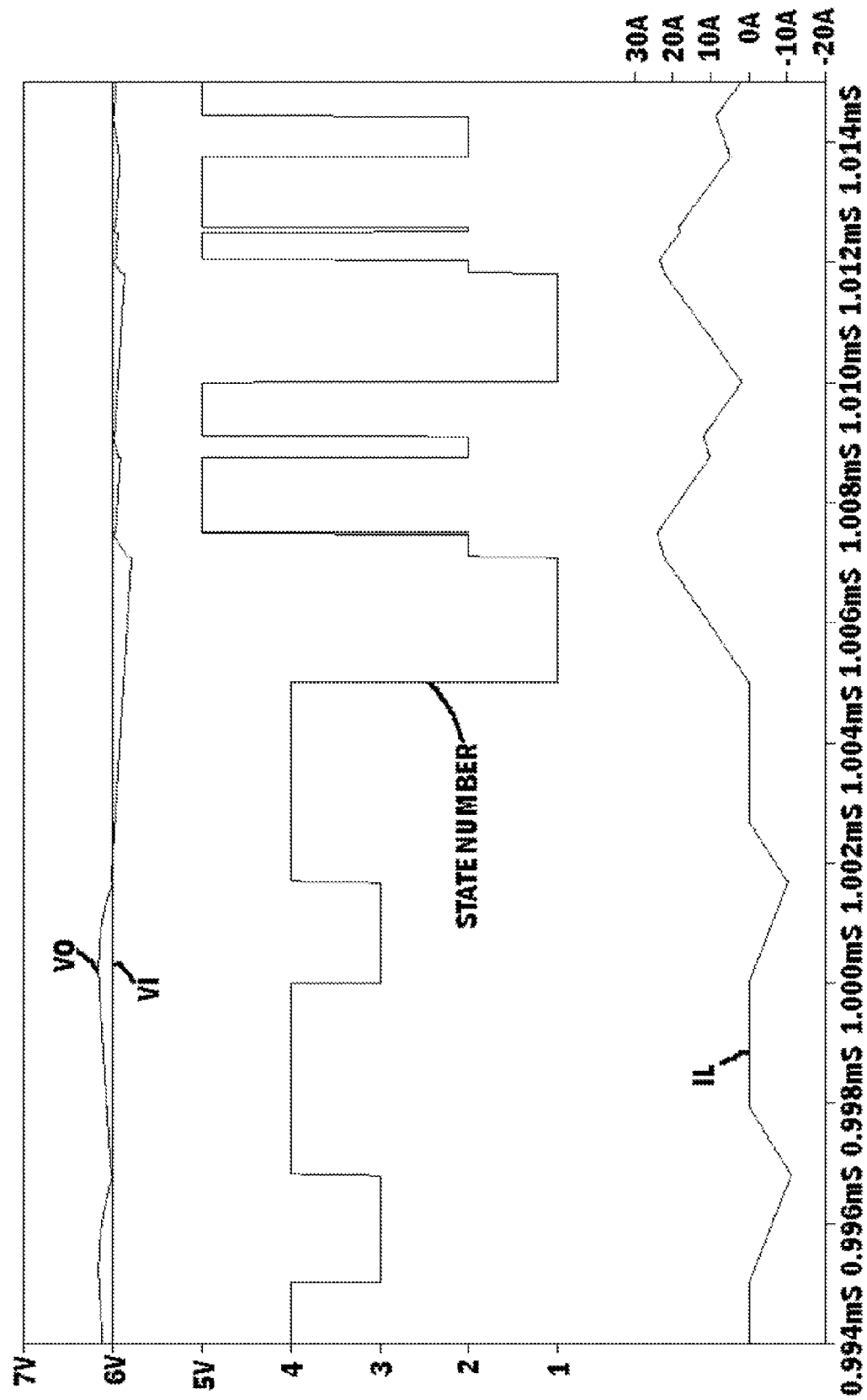
FIG. 7 shows additional performance details of the converter in FIG. 5.

FIG. 7 shows multiple states being used during single chopping cycles. The input voltage VI is steady at 6 volts. At 1.002 mS, the load changes from minus 2 to plus 2 amps. Before the load transition, States III and IV are alternating to effect reverse energizing and transfer. After the load transition, the inductor current moves in the positive direction during forward energize, State I. It rises for approximately 2 uS, then more slowly (due to the additive nature of the transfer) during the brief forward transfer, State II. State V follows, causing inductor current to flow back to the input VP. States II and V alternate once more before the end of the chopping cycle. The next forward cycle begins with State I at 1.01 mS. Note that the VO trace just touches the VI trace at the end of each asynchronously terminated state, except for State I, which is terminated by the inductive current limit.

Figure 8:
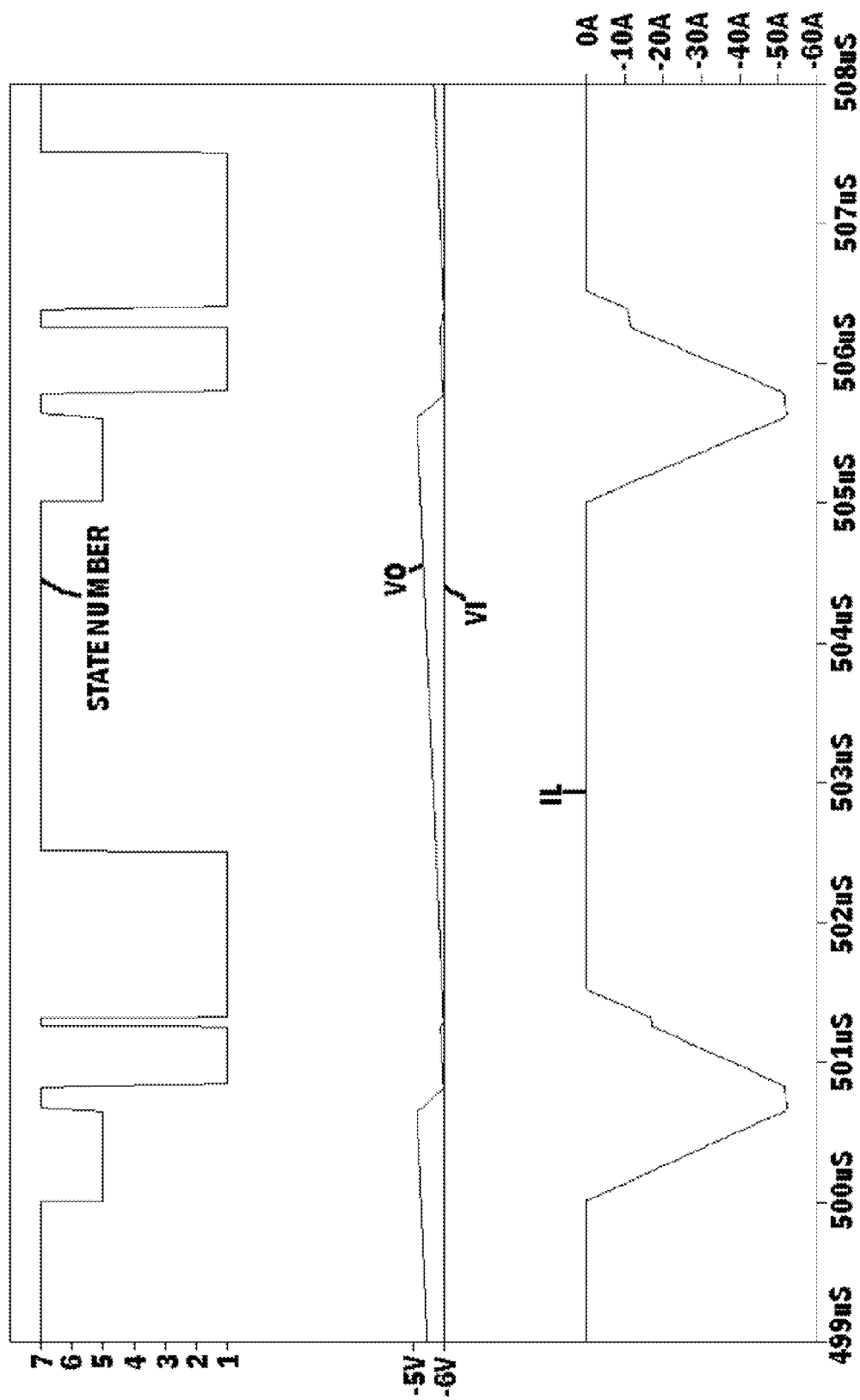
FIG. 8 shows more performance details of the converter in FIG. 5.

FIG. 8 also shows the use of three states per chopping cycle, this time with the input voltage VI steady at −6 volts. State VIII energizes the inductor, followed by State VII, which transfers energy until sufficiency, causing State IV to be invoked. State IV returns excess energy from the inductor to the input side. States VII and IV alternate once more before the end of the chopping cycle.

Figure 11:
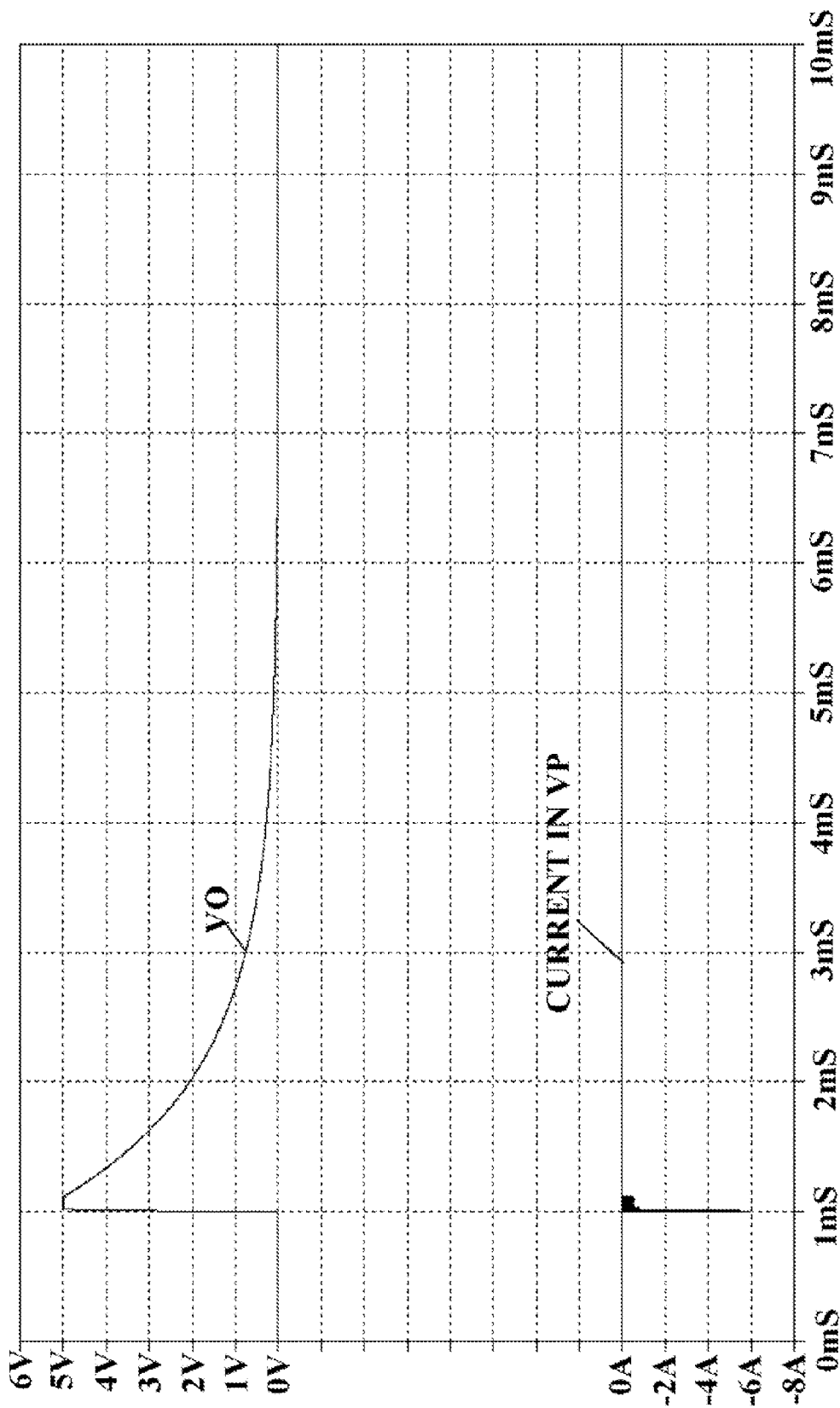
FIG. 11 shows more performance details of the converter in FIG. 9.

In a flyback converter it is usual for a diode or a synchronous rectifier, corresponding to S6 of FIG. 11, to switch ON upon the condition that inductor voltage exceeds output voltage, VO. According to this invention, adding to that basis the condition that desired input voltage, VI, exceed output voltage, VO, as shown in FIG. 5 allows this flyback converter, unlike the prior art, to generate VO substantially less than the inductor energizing voltage VP. To obtain this improvement, should the magnitude of VO exceed that of VI during State II, State V is invoked, turning off S6 to avoid generation of excess VO. It should be understood that an alternative path for any current in L must be provided to avoid excessive voltage. FIG. 5 provides such a path by invoking State V after forward transfers and State IV after negative forward transfers.

In FIG. 5, this improvement is embodied through the term "X", the output of a flip-flop BISX, that appears in the logical definition of States II and V, State II=M&/F&/X
State V=M&/F&X

EXAMPLE 2

Simplified Buck Converter Adapted for Capacitive Energy Recovery

Figure 9:
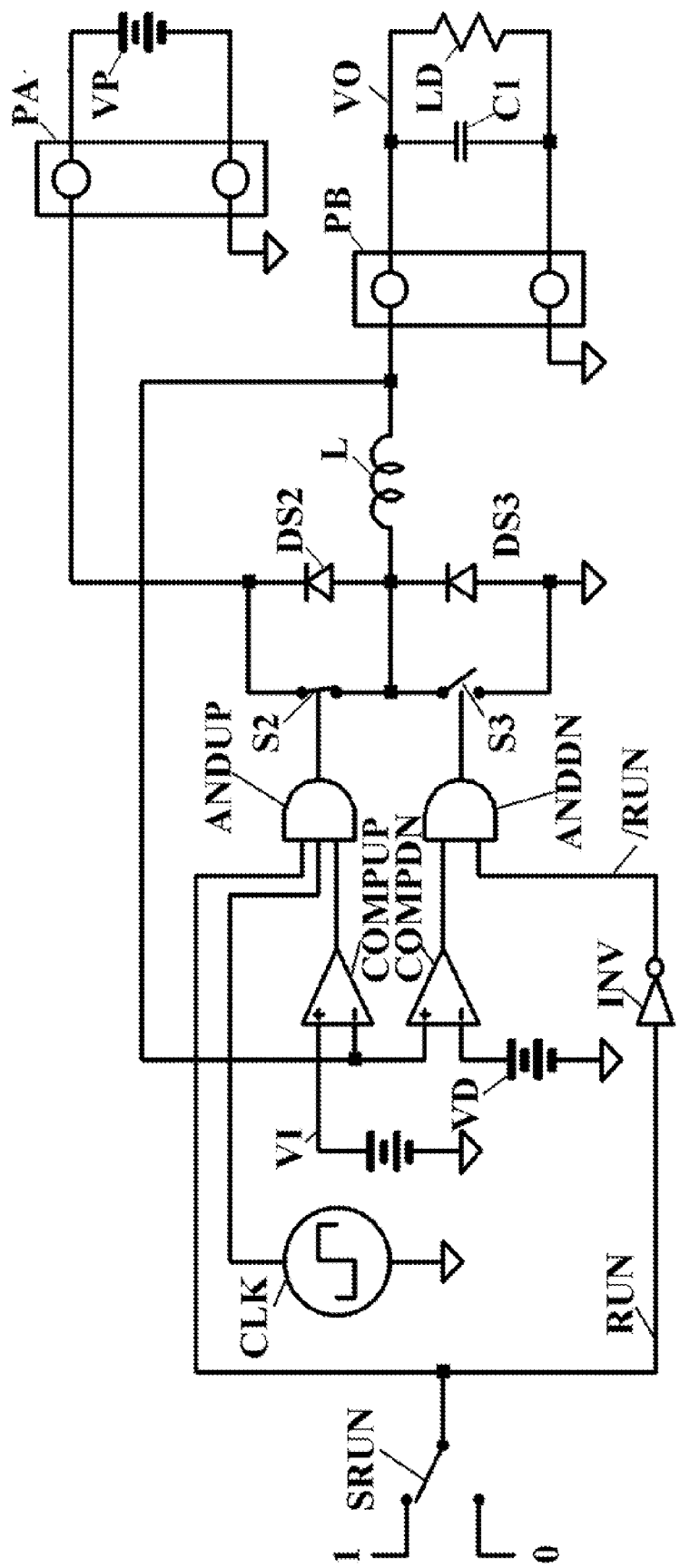
FIG. 9 shows a simple buck converter adapted for capacitive energy recovery.

FIG. 9 shows a simplified converter according to the present invention, which is capable of useful capacitive energy recovery, but is not agile like the full embodiment of example 1.

A signal RUN is provided by a switch SRUN, shown connected to a logical 1, which control signal may be provided by an external source. When RUN is asserted, the converter forms a buck converter.

Switches S2 and S3, usually MOSFETs, form a totem pole switch for the buck converter supplied through port PA from power input VP. DS2 and DS3 represent the body diodes of their respective FET switches, those switches shown here in idealized form. L is the switched inductor. Attached to port PB is a load LD comprising a substantially non-reactive current sink and a capacitor C1. C1 represents the aggregate of filter and bypass capacitors in shunt with the load. IGBT's, BJT's, or magnetic amplifiers may also be used as switches. Indeed the invention is meant to include any form of power switch.

The control for S2 is based on simple voltage feedback from VO to the inverting input of comparator COMPUP, the non-inverting input of which is connected to a voltage, VI, here 5 volts. AND gate ANDUP logically ANDs a 1 MHz signal from clock generator CLK with RUN and the output of comparator COMPUP. When the VO voltage is above VI, S2 is remains off. Otherwise, S2 switches responsively to CLK. Whenever the RUN signal is "O", S2 is held off by ANDUP. The circuit thus far described is a conventional buck converter with simple regulation.

S3 controls the energy recovery process. The inverter INV produces a /RUN signal that is ANDed with the output of Comparator COMPDN by AND gate ANDDN. COMPDN compares VO with a small threshold voltage VD, in this case, 1.2 volts. ANDDN turns S3 on when RUN is not asserted and VO is above VD. When S3 is on, current flows from C1 into L until VO falls below VD. At that time, S3 opens and the inductive energy flies back through DS2 back into VP.

Note that S2 could be turned on during recovery to avoid the diode loss in DS2, and that S3 could be turned on when DS3 was conducting to avoid the loss in DS3. The logic for those efficiencies is omitted here for clarity.

Figure 10:
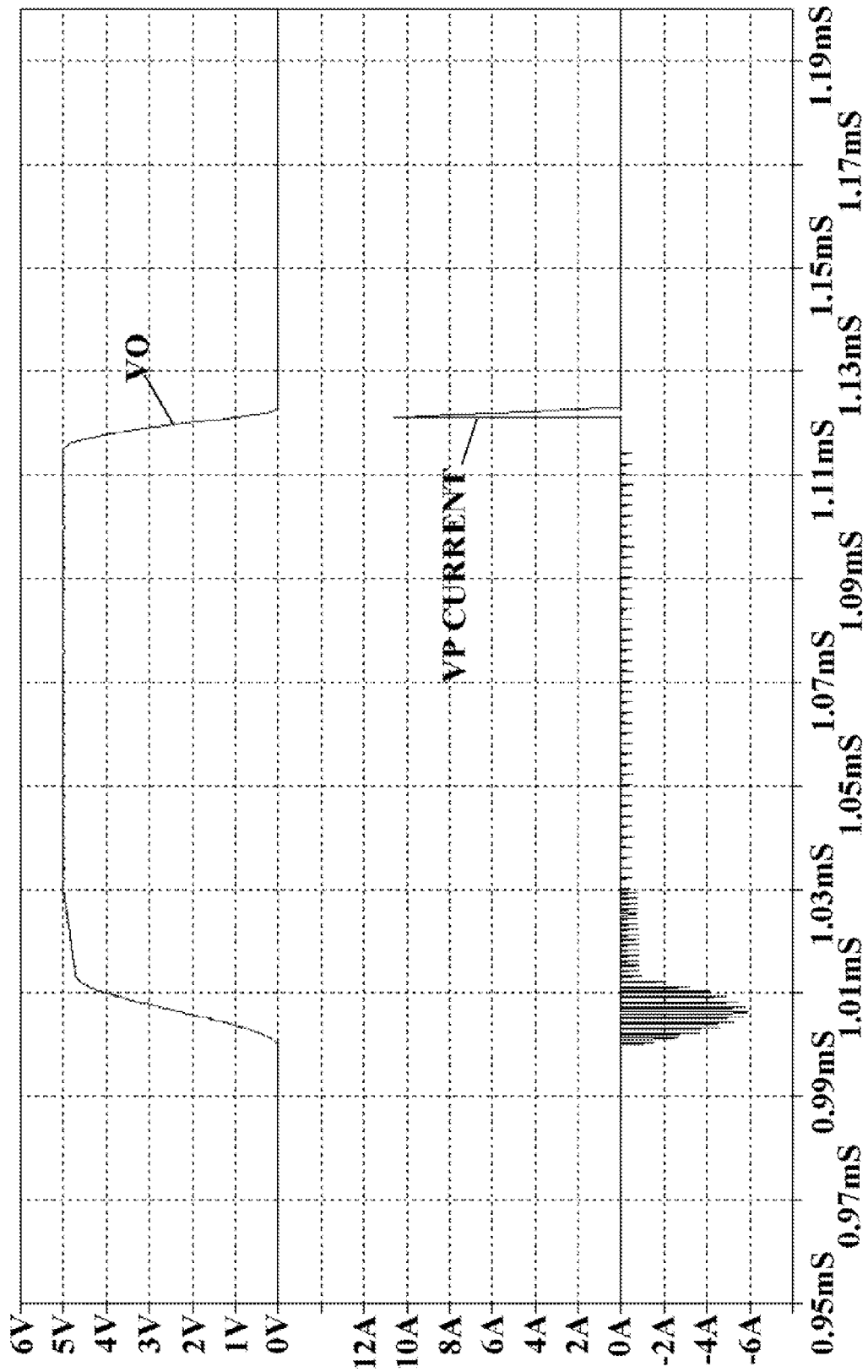
FIG. 10 shows performance details of the converter in FIG. 9.

FIG. 10 shows VO above, and the current at VP below. The RUN control rises to produce 100 microseconds of stable output. VO rises quickly to near VI when RUN is asserted, and falls quickly to near zero when RUN is unasserted. The power input current, I(VP) can be seen as supplying current during the RUN period, then having reactive energy from C1 returned through PA to VP at the end of that period.

FIG. 11 shows the same waveforms with S3 disabled. Note the much longer time required to show the VO voltage decay after a 100 uS power-up period. Approximately 40% of the energy required to maintain 1% duty-cycle at VO with a 10 mS period is recovered when S3 is active, none of which is recovered with S3 inactive.

Subtle but important features distinguish this invention from the prior art.

Though the prior art inventions usefully employ the energy that occurs in snubber capacitors, they do not recover energy stored in filter and bypass capacitors or in other external load capacitance.

The prior art is replete with unidirectional power converters capable of steady-state energy movement. An array of unidirectional converters can accomplish bidirectional energy movement, but is usually unable accurately and efficiently to slew voltages across capacitors. Nonetheless, conventional converters arrayed to recover energy from capacitive loads could implement the same functionality as this example, but require far more components, switches and complexity. Conventional converters do not have the ability to recovery capacitive load energy quickly enough to prevent a large portion of that energy being lost to an unneeded load.

Few prior art converters are bidirectional. Of those, many are forward converters. With adjustment made for turns ratio, a forward converter transfers energy from a higher voltage port to a lower voltage port, and not the opposite. Therefore, unless equipped with switchable turns ratio, forward converters are not suitable for returning energy from capacitors to an energy source.

The boost or flyback converter is most easily employed to empty capacitors back into energy sources as is shown in the above referenced applications. These embodiments represent a subset of the possible embodiments of this invention. They can and do, under control, return energy from a capacitor on a given port to another port. If the capacitive energy is large compared with the capability of the inductor, multiple alternating cycles of filling the inductor and then emptying it into another port may be needed to accomplish complete transfer.

Other embodiments of this invention may contain multiple inductive reactors for more expeditiously emptying capacitors. For instance, a multiple-phase converter may usually be used to move power from a source port to a load port, but when so commanded may, by overlapping its alternating cycles, provide a substantially constant path for removing unneeded power from a capacitive load port to be usefully employed elsewhere. Other embodiments of this invention may contain a transformer in place of the inductive reactor.

Regardless of the apparatus employed, this invention is practiced when capacitive energy in a significantly capacitive load, no longer needed at a given power converter port, is recovered for use at another port. Smaller, but still significant, efficiencies can be gained through capacitive energy recovery if VO is lowered temporarily to reduce power consumption. By reducing the latency and inefficiency of temporary voltage reductions, that technique can be applied to advantage at much higher repetition rates. Using these innovations, computer circuitry need only be powered when it is needed.

What is claimed is:

1. A switched mode power converter comprising:
an inductive reactor,
a load port for supplying energy to a load, the load having a substantial capacitive component;
at least one other port;
at least two power switches connecting the inductive reactor, load port and at least one other port; and
control circuitry;
wherein energy is supplied to the load from the load port and excess energy from the capacitive component of the load is returned through the load port and converter to the at least one other port.

2. The converter of claim 1 wherein the at least one other port is connected to a power source.

3. The converter of claim 2 wherein the power source is a battery.

4. The converter of claim 2 wherein the power source is a power supply.

5. The converter of claim 1, wherein said inductive reactor is a two-terminal inductor.

6. The converter of claim 1, wherein said inductive reactor is a transformer.

7. The converter of claim 1, comprising plural inductive reactors.

8. The converter of claim 1 wherein the load is a portable electronic device.

9. The converter of claim 1 wherein the load is a computer.

10. The converter of claim 1 wherein the excess energy is the result of reducing power to or turning off the load.

11. The method of:
transferring energy from a significantly capacitive load in circuit with a port of a switched mode power converter into an inductive reactor and,
transferring said energy now in said inductive reactor to another port for immediate use or for storage.

12. The method of claim 11 wherein the energy transferred from the load capacitance to another port effects a desired voltage reduction at the load.

* * * * *

UNITED STATES PATENT AND TRADEMARK OFFICE
CERTIFICATE OF CORRECTION

PATENT NO. : 8,134,347 B2  Page 1 of 1
APPLICATION NO. : 12/358465
DATED : March 13, 2012
INVENTOR(S) : Thomas E. Lawson and William H. Morong It is certified that error appears in the above-identified patent and that said Letters Patent is hereby corrected as shown below:

On Drawing sheet 4 of 10 of the drawings, please replace Fig. 5 with the below corrected Fig. 5.

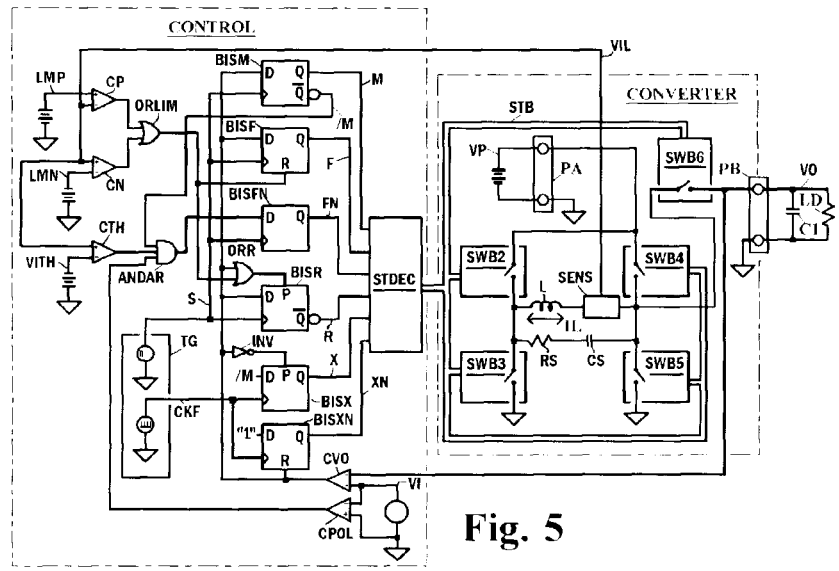

Signed and Sealed this
Twenty-first Day of May, 2013

Teresa Stanek Rea
*Acting Director of the United States Patent and Trademark Office*